UNITED STATES PATENT OFFICE.

DANIEL M. LAMB, OF LONDON, ONTARIO, CANADA.

IMPROVEMENT IN PROCESSES FOR REFINING PETROLEUM AND OTHER OILS.

Specification forming part of Letters Patent No. 183,401, dated October 17, 1876; application filed September 19, 1876.

*To all whom it may concern:*

Be it known that I, DANIEL MARTIN LAMB, of London, in the province of Ontario and Dominion of Canada, have invented a certain new and useful Process for Refining and Deodorizing Petroleum and other Oils, of which process the following is a specification:

My invention relates to the purification of oil by the combined agency of gas and water.

It has heretofore been proposed to refine petroleum by the agency of chlorine gas, applied in various ways. In some instances dry chlorine gas is introduced beneath or within the oil from a receiver or tank, in which the gas is made or contained. In other cases the gas is made or generated within the oil by the introduction of proper materials, as chloride of sodium and sulphuric acid, while the oil is agitated to cause the materials to permeate it throughout.

My invention consists in producing or evolving gas within the oil while the latter is at rest, by introducing a quantity of salt, which is permitted to settle to the bottom, and then a sufficient quantity of acid, which likewise settles to the bottom of the oil and flows over the salt, so as to reach all parts thereof and effectually decompose it, setting free the gas.

My invention further consists in cleansing oil which is permeated with chlorine gas, by the addition of water and the agitation of the mixture.

My invention further consists in discharging the gas from the oil by blowing, as hereinafter described.

My process is as follows: Having the oil in an agitator or other vessel, I introduce about two pounds of salt to each barrel of oil, and about an equal quantity of sulphuric acid, while the oil remains at rest. When this amount of salt has been fully decomposed, I introduce the same quantity of salt and a like quantity of sulphuric acid, still leaving the oil at rest. The decomposition being completed, the gas ascends and permeates the oil, and the precipitate or sediment is drawn off. Water is then introduced, say five or ten gallons to the barrel. The oil is then agitated for the first time, and agitation is continued from fifteen to thirty minutes, according to the nature of the oil under treatment. It is then allowed to stand till the water settles to the bottom. This is then drawn off, and a blower is applied to blow the gas out of the oil. I then apply sulphuric acid, amounting to from one to two per cent. of the volume of oil, and agitate again. The acid attacks the remaining impurities and carries them to the bottom in the usual way. The acid, being allowed to thoroughly settle, is drawn off, and the oil is thoroughly washed with water and allowed to settle, when it is ready for sale or use.

Among the advantages of my process and mode of treatment, as compared with others, I mention two, which are of great practical importance. First, by leaving the oil perfectly at rest while introducing the chloride of sodium and sulphuric acid I avoid any temporary dilution of the acid or separation of particles of salt, and cause the salt and acid to be brought into close contact, the salt being beneath and the acid falling on it and permeating its entire mass, so as to completely decompose it and set free the gas. Second, the presence of water with the gas within the oil during its first agitation greatly facilitates the action of the chlorine on the impurities in the oil.

As the bleaching and purifying effect is produced by the agitation of the oil, gas, and water together, it is manifest that this part of the process may be performed with gas made in another vessel and conducted into that containing the oil and water.

Having thus described my invention, the following is what I claim as new and desire to secure by Letters Patent—

1. In the art of treating oils by the agency of gas generated by the admixture of sodium chloride and sulphuric acid, the first step toward bleaching and deodorizing, which consists in generating the gas beneath the oil, and while the same is at rest, thus permitting the gas to permeate the oil and act upon the entire body, substantially as described.

2. The process of treating oil by agitating in contact with the gas and water, drawing off the water, and discharging the gas by blowing air through the body of oil, substantially as described.

D. M. LAMB.

Witnesses:
OCTAVIUS KNIGHT,
LE BLOND BURDETT.